US012374788B2

(12) United States Patent
Zhou et al.

(10) Patent No.: US 12,374,788 B2
(45) Date of Patent: Jul. 29, 2025

(54) HOLOGRAPHIC ANTENNA, MANUFACTURING METHOD THEREOF AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Jian Zhou, Beijing (CN); Yuehua Liu, Beijing (CN); Long Wang, Beijing (CN); Yiqun Hu, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/029,353

(22) PCT Filed: Jun. 29, 2022

(86) PCT No.: PCT/CN2022/102208

§ 371 (c)(1),
(2) Date: Mar. 29, 2023

(87) PCT Pub. No.: WO2024/000226

PCT Pub. Date: Jan. 4, 2024

(65) Prior Publication Data

US 2024/0364005 A1 Oct. 31, 2024

(51) Int. Cl.
*H01Q 3/24* (2006.01)
*H01Q 13/10* (2006.01)
(Continued)

(52) U.S. Cl.
CPC ............ *H01Q 3/24* (2013.01); *H01Q 13/106* (2013.01); *H01Q 21/005* (2013.01); *H01Q 21/0087* (2013.01); *H01Q 23/00* (2013.01)

(58) Field of Classification Search
CPC ...... H01Q 3/24; H01Q 13/106; H01Q 21/005; H01Q 21/0087; H01Q 23/00
See application file for complete search history.

(56) References Cited

U.S. PATENT DOCUMENTS

2015/0222014 A1 8/2015 Stevenson et al.
2015/0288063 A1* 10/2015 Johnson .................. H01Q 3/24
342/368

FOREIGN PATENT DOCUMENTS

CN 110034416 A 7/2019
CN 111585028 A 8/2020
(Continued)

*Primary Examiner* — Graham P Smith
(74) *Attorney, Agent, or Firm* — HOUTTEMAN LAW LLC

(57) ABSTRACT

The present disclosure provides a holographic antenna, a method for manufacturing a holographic antenna and an electronic device, and belongs to the field of communication technology. The holographic antenna includes: at least one antenna unit; each antenna unit includes a waveguide structure, a first dielectric substrate and a radiation layer; the waveguide structure includes a bottom wall and a sidewall connected together to define a waveguide cavity of the waveguide structure; a filling medium is filled in the waveguide cavity; the first dielectric substrate is on a side of the filling medium away from the bottom wall of the waveguide structure; and the radiation layer is on the first dielectric substrate, and is provided with a plurality of slit openings therein; an orthographic projection of the plurality of slit openings on the first dielectric substrate is within an orthographic projection of the waveguide cavity on the first dielectric substrate.

18 Claims, 9 Drawing Sheets

(51) Int. Cl.
*H01Q 21/00* (2006.01)
*H01Q 23/00* (2006.01)

(56) References Cited

FOREIGN PATENT DOCUMENTS

| | | | |
|---|---|---|---|
| CN | 112640213 | A | 4/2021 |
| CN | 113437492 | A | 9/2021 |

* cited by examiner

HOLOGRAPHIC ANTENNA, MANUFACTURING METHOD THEREOF AND ELECTRONIC DEVICE

TECHNICAL FIELD

The present disclosure relates to the field of communication technology, and in particular to a holographic antenna, a method for manufacturing a holographic antenna and an electronic device.

BACKGROUND

The operation performance of an antenna, which is used as a terminal device of most wireless communication systems, is critical to the overall performance of the system. With the development of science and technology, the requirements on performances of the antenna become higher and higher. In addition to the high requirements on conventional indicators such as a gain, a polarization, etc., the antenna is usually required to have characteristics such as low profile, light weight, easy conformality, etc. A reflector antenna, a phased array antenna or a lens antenna or the like can realize high gain, but each has obvious disadvantages. For example, it is required to provide a spatial illumination source for the reflector antenna, which greatly increases a profile; a feed network of the phased array antenna is extremely complex, difficult to design and has a high cost; the illumination source is provided for the lens antenna having a higher profile, which further increases the profile of the lens antenna. A holographic antenna is an antenna having a high gain, can meet the requirements of low profile, light weight and the like, and thus, is very suitable for the current application background and has a full development potential.

SUMMARY

The present disclosure aims to solve at least one of the technical problems in the prior art, and provides a holographic antenna, a method for manufacturing a holographic antenna and an electronic device.

In a first aspect, an embodiment of the present disclosure provides a holographic antenna, including: at least one antenna unit; each antenna unit includes a waveguide structure, a first dielectric substrate and a radiation layer; the waveguide structure includes a bottom wall and a sidewall connected together to define a waveguide cavity of the waveguide structure, and a filling medium is filled in the waveguide cavity; the first dielectric substrate is on a side of the filling medium away from the bottom wall of the waveguide structure; and the radiation layer is on the first dielectric substrate, and is provided with a plurality of slit openings therein; an orthographic projection of the plurality of slit openings on the first dielectric substrate is within an orthographic projection of the waveguide cavity on the first dielectric substrate.

In some embodiments, the first dielectric substrate is on the sidewall of the waveguide structure and forms an enclosed space together with the waveguide cavity of the waveguide structure.

In some embodiments, the first dielectric substrate and the radiation layer are within the waveguide cavity of the waveguide structure.

In some embodiments, the radiation layer is on a side of the first dielectric substrate away from the filling medium; the antenna unit further includes a plurality of switching units arranged on a side of the radiation layer away from the first dielectric substrate; the plurality of switching units correspond to the plurality of slit openings; and each switching unit is configured to control a switching state of the corresponding slit opening.

In some embodiments, each switching unit includes any one of a PIN diode, a variable reactance diode, a liquid crystal switch, and a MEMS switch.

In some embodiments, the radiation layer includes a microstrip line; the plurality of slit openings are arranged side by side along an extending direction of the microstrip line, and a length direction of each slit opening is perpendicular to the extending direction of the microstrip line.

In some embodiments, the holographic antenna further includes a feed structure configured to feed a microwave signal into the waveguide structure.

In some embodiments, the feed structure includes a coaxial probe.

In some embodiments, the at least one antenna unit includes a plurality of antenna units; and the feed structure includes a power division feed network.

In some embodiments, the at least one antenna unit includes 2" antenna units, and the power division feed network includes a waveguide power division feed network, including sub-waveguides in n stages; each sub-waveguide includes one main line and two branches connected to the main line; for each sub-waveguide at the first stage, two branches of the sub-waveguide are respectively connected to the waveguide structures of two antenna units, and different branches are connected to the waveguide structures of different antenna units; and two branches of each sub-waveguide at the (i+1) th stage are respectively connected to the main lines of two sub-waveguides at the i-th stage, and the main branches of different sub-waveguides at the i-th stage are connected to different branches of the corresponding sub-waveguides at the (i+1) th stage, which; $1<i\leq N-1$.

In some embodiments, the maximum distance between the branches of each sub-waveguide is D1, and the minimum distance between any two adjacent sub-waveguides in each stage is D2, and D1=D2.

In some embodiments, a width of each slit opening is in a range of $\lambda g/10$ to $\lambda g/20$; and a length of each slit opening is in a range of $\lambda g/2$ to $\lambda g/6$.

In some embodiments, the filling medium includes a slow wave medium.

In a second aspect, an embodiment of the present disclosure provides a method for manufacturing a holographic antenna, including: forming at least one antenna unit; the forming at least one antenna unit includes: forming a waveguide structure; forming a filling medium in a waveguide cavity of the waveguide structure; and providing a first dielectric substrate formed with a first radiation layer on a side of the filling medium away from a bottom wall of the waveguide structure; wherein the radiation layer is provided with a plurality of slit openings therein; an orthographic projection of the plurality of slit openings on the first dielectric substrate is located in an orthographic projection of the waveguide cavity on the first dielectric substrate.

In a third aspect, an embodiment of the present disclosure provides an electronic device, which includes the holographic antenna of any one of the above embodiments.

DETAIL DESCRIPTION OF EMBODIMENTS

Figure 1:
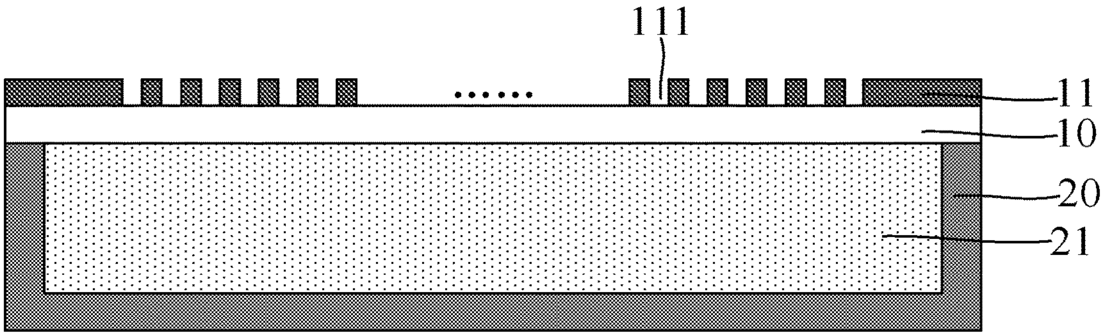
FIG. 1 is a schematic diagram of a part of a holographic antenna according to an embodiment of the present disclosure.

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

The concept of the holographic antenna is derived from the optical holographic principle, which is that an interference surface is formed by interference of a target wave and a reference wave, and then the interference surface is irradiated by the reference wave to obtain the target wave through the inversion. Due to the presence of a metamaterial, it is possible to implement the holographic antenna in the microwave band. A holographic antenna system only includes a holographic surface and a feed source, which is very simple in structure; the feed source generally adopts a horn antenna, a monopole antenna or a slit antenna, and does not need a complex feed network. In order to reduce the profile, the monopole antenna or the slit antenna is often used as the feed source; the holographic surface mainly includes a dielectric substrate and a metal patch array with periodically distributed patches, and the holographic surface is simple to process and has a low cost; in the design process of the holographic surface, the required holographic surface can be obtained only by calculating an expression of an interference field formed by the interference of the target field and the reference field and designing a distribution of the metal patches according to the expression of the interference field, and the design process is very simple. In order to obtain a different target wave, an expression of the target field is substituted into the process again. This simplicity and flexibility in design is another great advantage of the holographic antenna. In addition, the holographic antenna has characteristics of easy conformality, and the performance of the holographic antenna is not greatly influenced when the holographic antenna is attached to a curved surface such as a spherical surface, a cylindrical surface or the like, so that the holographic antenna is very suitable for applications such as an aircraft, a seeker of a missile and the like.

Re-configurability is new requirements on the modern antenna, so that the reusability of the antenna can be greatly improved, and the cost and the complexity of the antenna system are reduced. For example, a frequency reconfigurable antenna can operate at multiple frequency points; a polarization reconfigurable antenna can realize multiple polarization modes; a beam reconfigurable antenna can be switched among multiple beam directions (beam pointing) and has the function of a phased scanning array. If a holographic antenna uses a reconfigurable unit and has re-configurability, multiple functions such as beam scanning, multi-beam synthesis and polarization reconfiguration and the like can be realized through one holographic surface. Thus, the holographic antenna has a huge application potential. However, most of the conventional holographic antennas adopt square or circular metal patch units, and the structure of the holographic antenna cannot be changed and thus, re-configurability cannot be realized. In addition, even if reconfigurable units are found, the dynamic regulation and control of each unit is very difficult because the holographic antenna has numerous units, up to hundreds or thousands of units. For the reasons, research on re-configurability of the holographic antenna is still blank at present, and the difficulty lies in the design of the reconfigurable units and the realization of the dynamic regulation and control.

Figure 2:
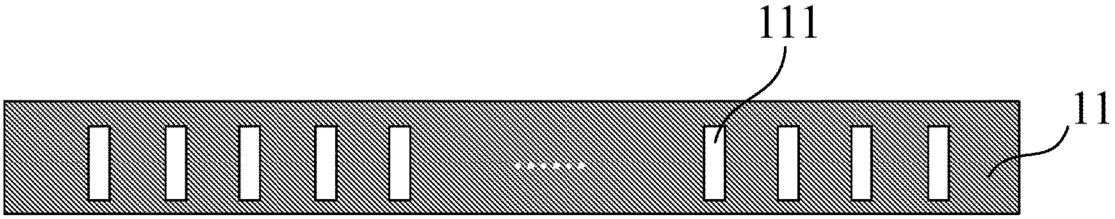
FIG. 2 is a top view of a radiation layer of a holographic antenna according to an embodiment of the present disclosure.

In a first aspect, FIG. 1 is a schematic diagram of a part of a holographic antenna according to an embodiment of the present disclosure. FIG. 2 is a top view of a radiation layer 11 of a holographic antenna according to an embodiment of the present disclosure. As shown in FIGS. 1 and 2, the embodiment of the present disclosure provides a holographic antenna, which includes: at least one antenna unit; each antenna unit includes a waveguide structure 20, a first dielectric substrate 10 and a radiation layer 11; the waveguide structure 20 includes a bottom wall and a sidewall connected together to define a waveguide cavity of the waveguide structure 20, and a filling medium 21 is filled in the waveguide cavity; the first dielectric substrate 10 is positioned on a side of the filling medium 21 away from the bottom wall of the waveguide structure 20; the radiation layer 11 is arranged on the first dielectric substrate 10, and is provided with a plurality of slit openings 111 therein; an orthographic projection of the slit openings 111 on the first dielectric substrate 10 is located within an orthographic projection of the waveguide cavity on the first dielectric substrate 10.

In the embodiment of the present disclosure, the waveguide structure 20 is configured to radiate a received microwave signal through the slit openings 111 of the radiation layer 11, and the filling medium 21 filled in the waveguide structure 20 can realize single-mode transmission. According to the holographic principle, in the control process of the beams, different pointing of the beams is realized by designing patterns of the slit openings 111 at different positions of the radiation layer 11, and an impedance matching in a large angle range is realized by combining a single-mode transmission waveguide, improving the beam shaping characteristics.

In some examples, the filling medium 21 filled in the waveguide structure 20 is a slow wave medium, so as to ensure that the single-mode transmission can be realized in an operating frequency band of the holographic antenna, thereby effectively reducing high-order mode excitation of the holographic antenna. For example: the slow wave medium may be a polymer material with a low loss to achieve the effect of a slow wave waveguide. Alternatively, an air medium may be filled in the waveguide cavity.

In some examples, as shown in FIG. 1, the radiation layer 11 may be disposed on a side of the first dielectric substrate 10 close to the bottom wall of the waveguide structure 20, or on a side of the first dielectric substrate 10 away from the bottom wall of the waveguide structure 20. In the embodiment of the present disclosure, as an example, the radiation layer 11 is disposed on the side of the first dielectric substrate 10 away from the bottom wall of the waveguide structure 20, which does not limit the protection scope of the embodiment of the present disclosure.

In some examples, the first dielectric substrate 10 may be disposed on the sidewall of the waveguide structure 20. That is, the first dielectric substrate 10 is disposed outside the waveguide cavity. In this case, the filling medium 21 fills the whole waveguide cavity, which is convenient to manufacture, simple in structure, and easy to implement.

Figure 3:
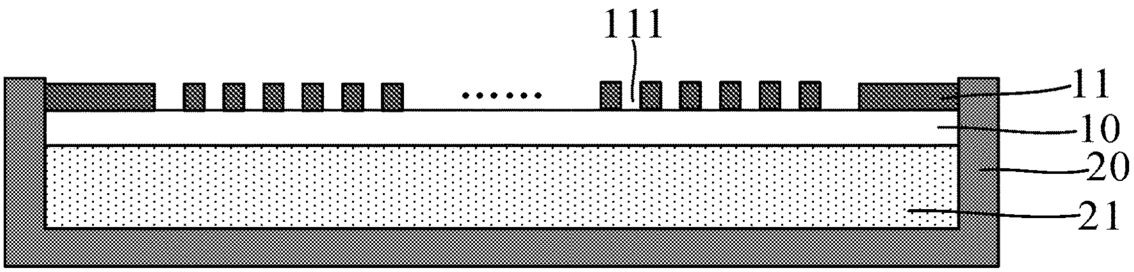
FIG. 3 is a schematic diagram of a part of another holographic antenna according to embodiments of the present disclosure.

In some examples, FIG. 3 is a schematic diagram of a part of another holographic antenna according to embodiments of the present disclosure. As shown in FIG. 3, the first dielectric substrate 10 may alternatively be disposed in the waveguide cavity of the waveguide structure 20, which can effectively improve the energy limiting capability and ensure efficient radiation capability. It should be noted that when the first dielectric substrate 10 is embedded inside the waveguide cavity, the first dielectric substrate 10 and the inner wall of the waveguide cavity may be fixed by an adhesive tape, so that the first dielectric substrate 10 and the waveguide cavity form a closed space, avoiding the energy leakage.

In some examples, a size of the waveguide cavity of the waveguide structure 20, and thicknesses of the sidewall and the bottom wall of the waveguide structure 20 determine the effect of the single-mode transmission, which is described below with reference to specific examples.

Figure 4:
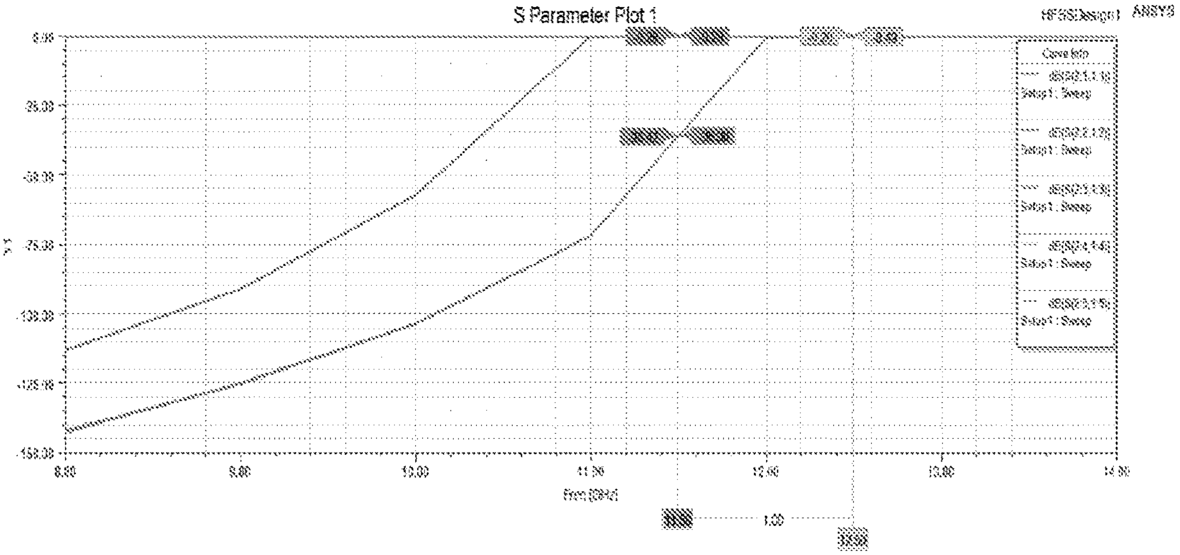
FIG. 4 is a waveguide transmission diagram of a waveguide structure with a first size of a holographic antenna according to an embodiment of the present disclosure.
Figure 5:
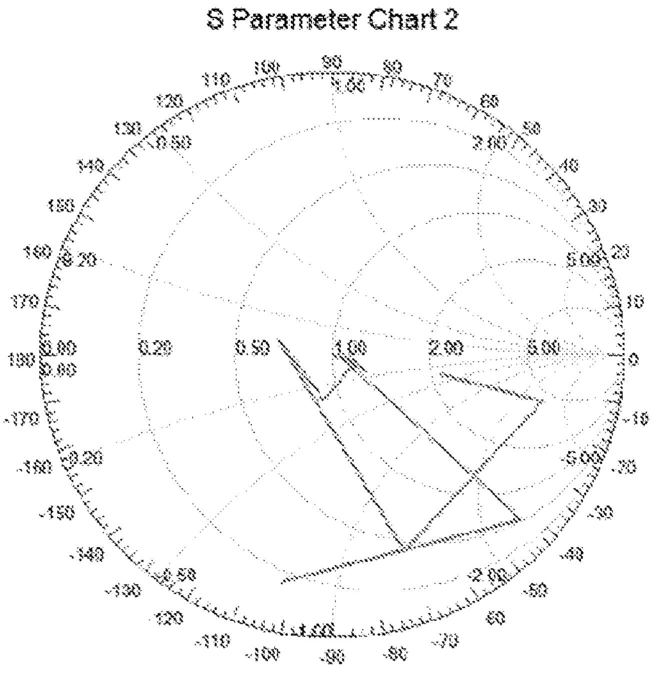
FIG. 5 is a Smith chart of a waveguide structure with a first size of a holographic antenna according to an embodiment of the present disclosure.

In a first example, the waveguide structure 20 has a first size, that is, a length and a width of the waveguide cavity of the waveguide structure 20 are 19.05 mm and 9.525 mm, respectively; and each of the thicknesses of the sidewall and the bottom wall of the waveguide structure 20 is 2 mm. FIG. 4 is a waveguide transmission diagram of a waveguide structure 20 with a first size of a holographic antenna according to an embodiment of the present disclosure. FIG. 5 is a Smith chart of a waveguide structure 20 with a first size of a holographic antenna according to an embodiment of the present disclosure. It can be seen from FIG. 4 that signals can be transmitted in multiple modes including a fundamental mode and high-order modes in a target bandwidth in a range of 11.5 GHz to 12.5 GHz, which affects the impedance matching characteristics of ports. As shown in FIG. 5, the Smith chart is very divergent and is far away from a matching point of 50Ω.

Figure 6:
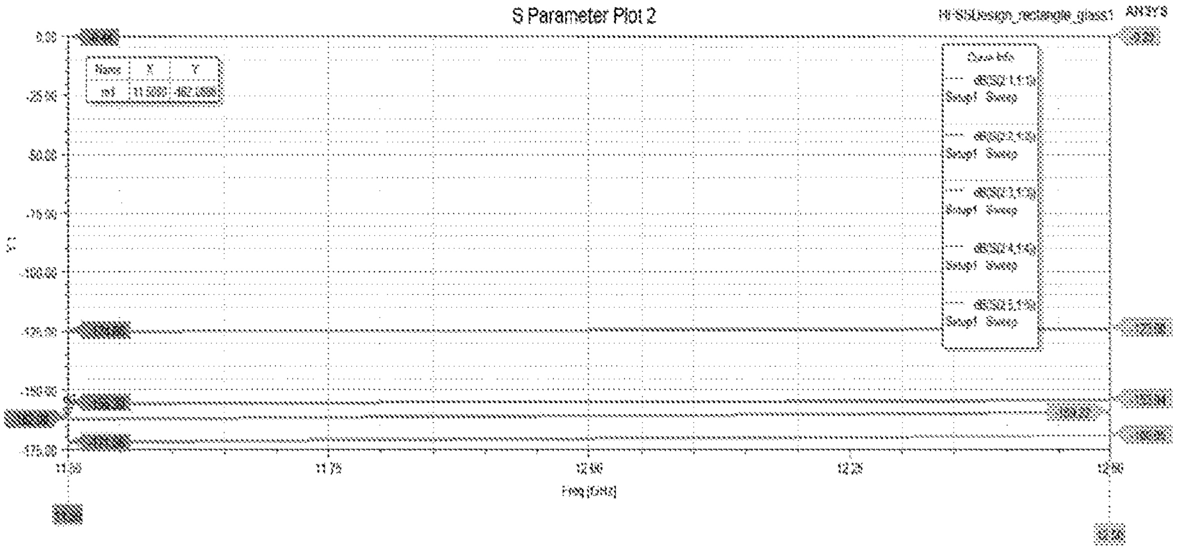
FIG. 6 is a waveguide transmission diagram of a waveguide structure with a second size of a holographic antenna according to an embodiment of the present disclosure.
Figure 7:
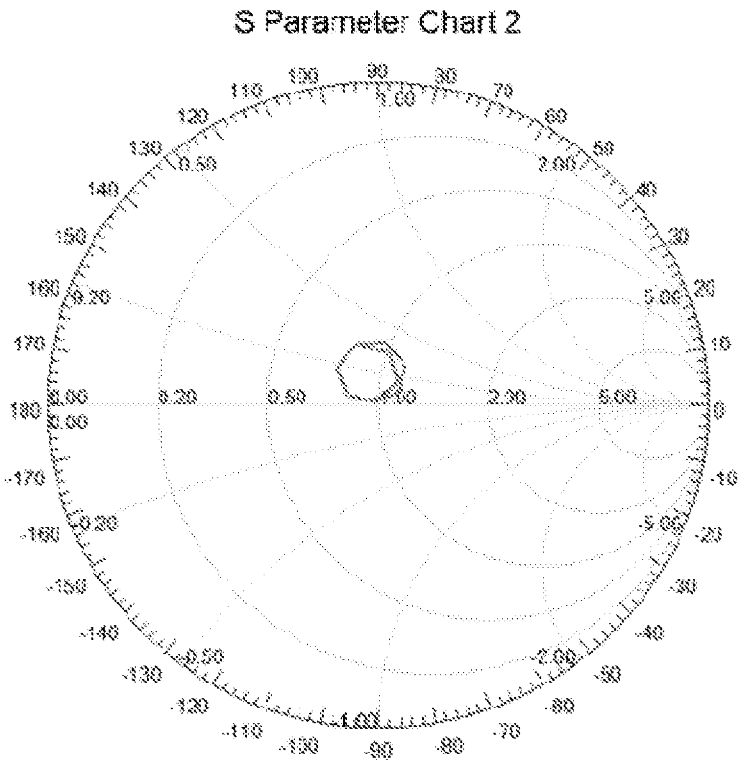
FIG. 7 is a Smith chart of a waveguide structure with a second size of a holographic antenna according to an embodiment of the present disclosure.

In a second example, the waveguide structure 20 has a second size, that is, the length and the width of the waveguide cavity of the waveguide structure 20 are 13.7 mm and 6.85 mm, respectively, and each of the thicknesses of the sidewall and the bottom wall of the waveguide structure 20 is 2 mm; FIG. 6 is a waveguide transmission diagram of a waveguide structure 20 with a second size of a holographic antenna according to an embodiment of the present disclosure. FIG. 7 is a Smith chart of a waveguide structure 20 with a second size of a holographic antenna according to an embodiment of the present disclosure. It can be seen from FIG. 6 that signals can be effectively transmitted only in a target fundamental mode in the target bandwidth in the range of 11.5 GHz to 12.5 GHz, and the transmission of signals in other high-order modes is suppressed, so as to ensure the convergence of the Smith chart in the range of the target bandwidth, as shown in FIG. 7. As can be seen in FIG. 6, which is the diagram showing a distribution of an electric field in the transmission at 12 GHz, FIG. 6 clearly shows the different energy distributions at intervals, indicating that signals can be transmitted in the mode at 12 GHz and in other modes, which causes disturbances. In FIG. 7, the electric field is uniformly distributed, indicating the single-mode transmission at 12 GHz, thereby ensuring the effect of the single-mode transmission.

In some examples, the radiation layer 11 on the first dielectric substrate 10 includes, but is not limited to, a microstrip line. In the embodiment of the present disclosure, the radiation layer 11 is the microstrip line, as an example.

The slit openings 111 in the microstrip line may be specifically arranged in the following way.

S10, determining the number n of disposition areas (areas for providing the slit openings 111) on the microstrip line, a simulation frequency f and a scanning angle (the horizontal direction angle $\theta_0$).

For example: n is specifically selected to be 30, 50, 64, 100, 200, or the like, and can be selected according to actual requirements; f is specifically, for example, 26 GHz, and may be any frequency in a range from 24.0 GHz to 28 GHz; $\theta_0$ is specifically, for example, 0°, ±30°, ±40°, ±60° or other angles.

S20, obtaining an excitation amplitude value m of each disposition area based on the amplitude weighting principle of the holographic antenna according to n, f and $\theta_0$, by defining an extending direction of the microstrip line as a y axis, defining a direction perpendicular to the extending direction of the microstrip line and parallel to a side surface of the first dielectric substrate 10 as an x axis, and defining a direction perpendicular to the side surface of the first dielectric substrate 10 as a z axis.

It should be noted that the amplitude weighting principle of the holographic antenna specifically is: by taking a one-dimensional structure as an example, and assuming that the slit openings 111 are distributed along the y axis, expressions of a reference wave and a target wave are respectively:

$$\Psi_{ref}(\vec{r}) = \exp(-ik_g \cdot \vec{r})$$

$$\Psi_{obj}(\vec{r}; \theta_0, \varphi_0) = \exp(-ik_0(\theta_0, \varphi_0) \cdot \vec{r})$$

Where $k_f$ is a target wave vector; $k_s$ is a reference wave vector; $\varphi_0$ is a beam pointing angle; i is between 0 and n.

According to the interference principle, an interference pattern recorded on the holographic structure is as follows:

$$\Psi_{intf} = \Psi_{obj}\Psi^*_{ref}$$

$$\Psi_{intf}(\vec{r}; \theta_0, \varphi_0) = \exp(-ik_f(\theta_0, \varphi_0) \cdot \vec{r})\exp(ik_g \cdot \vec{r})$$

The analysis is performed with an amplitude sampling function as follows:

$$m(\vec{r}; \theta_0, \varphi_0) = \frac{Re(\Psi_{intf}(\vec{r}; \theta_0, \varphi_0)) + 1}{2} = \frac{\cos((k_g - k_f(\theta_0, \varphi_0)) \cdot \vec{r}) + 1}{2}$$

Where $m(\vec{r}; \theta_0; \varphi_0)$ represents the excitation amplitude value of the holographic antenna at a position $\vec{r}$ at the horizontal direction angle $\theta_0$; the beam pointing angle $\varphi_0$. $m(\vec{r}; \theta_0; \varphi_0)$ is in a range from 0 to 1.

A far-field radiation pattern is calculated by substituting the above amplitude sampling function into the following equation:

$$\vec{H}_{rad} = H_0 \frac{\omega^2}{4\pi r} e^{-jkr} \cos\theta \sum_{i=1}^{N} e^{-a_f x_i} m(\vec{r}; \theta_0, \varphi_0) e^{-jk_g x_i} e^{jk_f x_i \sin\varphi}$$

$$a_f = \frac{\omega\mu_0}{4D_s A_c} \frac{\sin((k_g - k_f(\theta_0, \varphi_0)) \cdot \vec{r})}{Re\{\eta\}}$$

S30, performing a discrete processing on the excitation amplitude value of each disposition area by using a binary method, wherein a discrete threshold is t, and 0<t<1; and when the excitation amplitude value m of the disposition area is not less than t, a discrete result M is recorded as 1, and when the excitation amplitude value m of the disposition area is less than t, a discrete result M is recorded as 0.

S40, providing the slit opening 111 in the corresponding disposition area according to the discrete result M. For example: no slit opening 111 is provided in the disposition area with the discrete result M of 0, and the slit opening 111 is provided in the disposition area with the discrete result M of 1.

Figure 8:
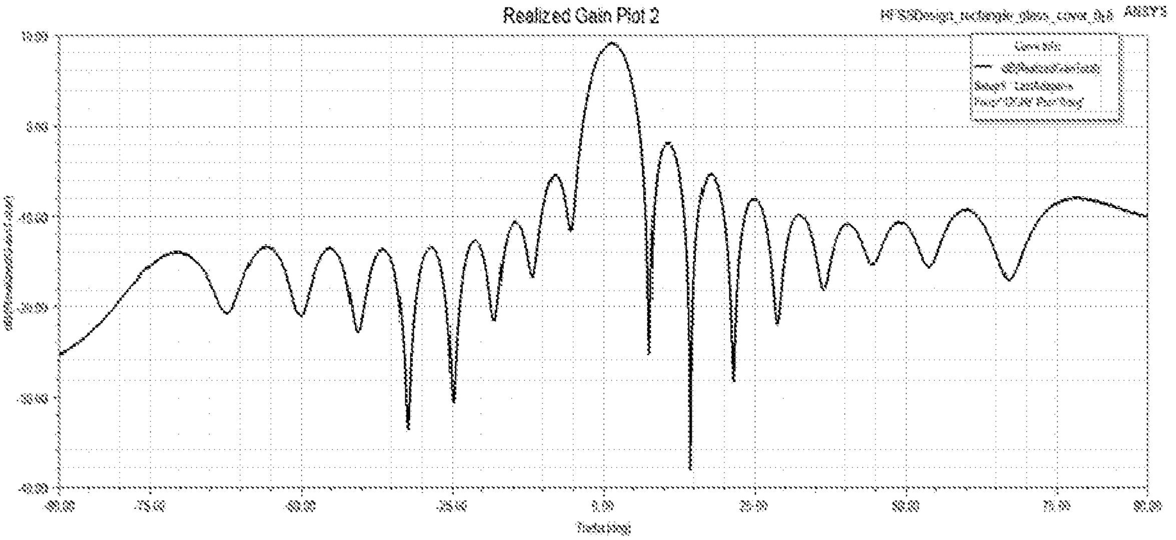
FIG. 8 is a simulated radiation pattern of a holographic antenna at a horizontal direction angle $\theta_0$ of 0° according to an embodiment of the present disclosure.
Figure 9:
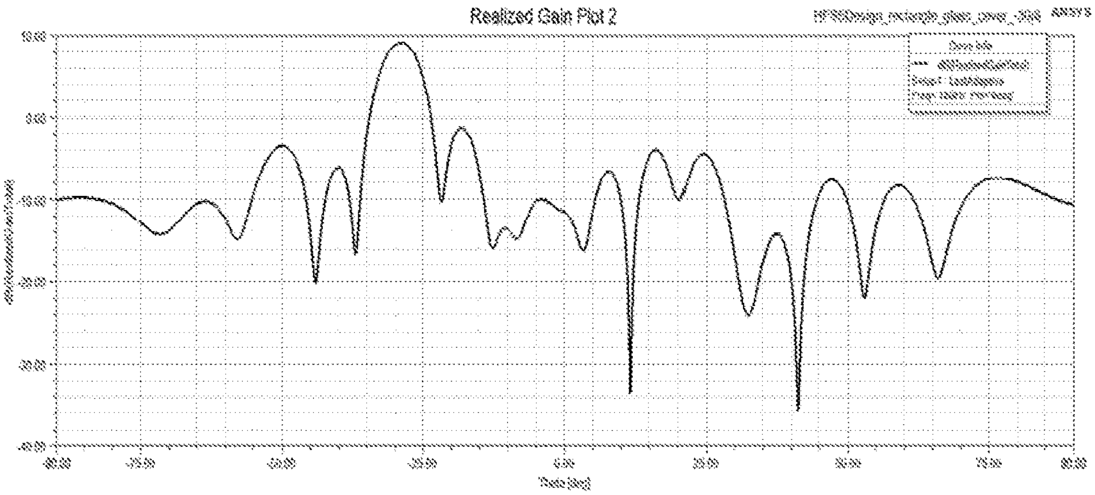
FIG. 9 is a simulated radiation pattern of a holographic antenna at a horizontal direction angle $\theta_0$ of −30° according to an embodiment of the present disclosure.
Figure 10:
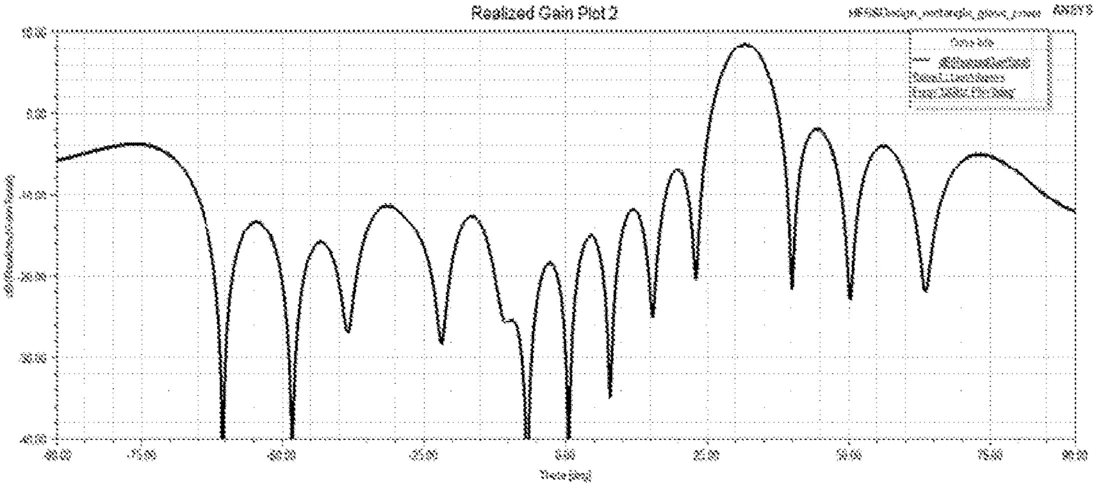
FIG. 10 is a simulated radiation pattern of a holographic antenna at a horizontal direction angle $\theta_0$ of 30° according to an embodiment of the present disclosure.
Figure 11:
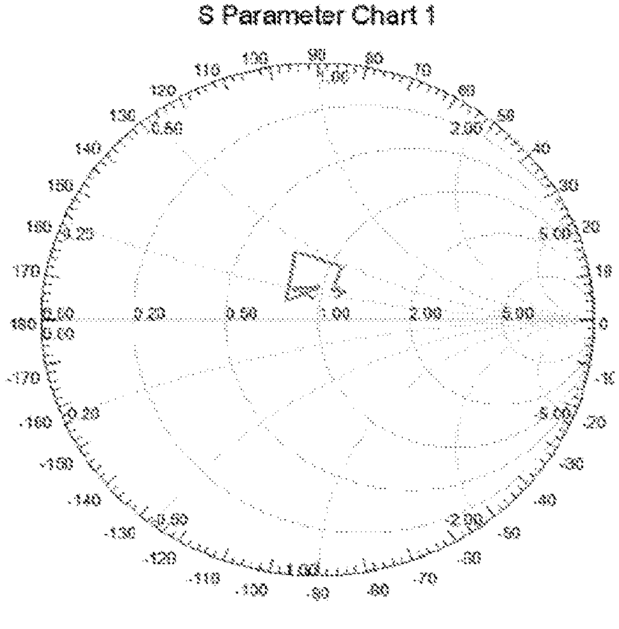
FIG. 11 is a Smith chart of a holographic antenna at a horizontal direction angle $\theta_0$ of 0° according to an embodiment of the present disclosure.
Figure 12:
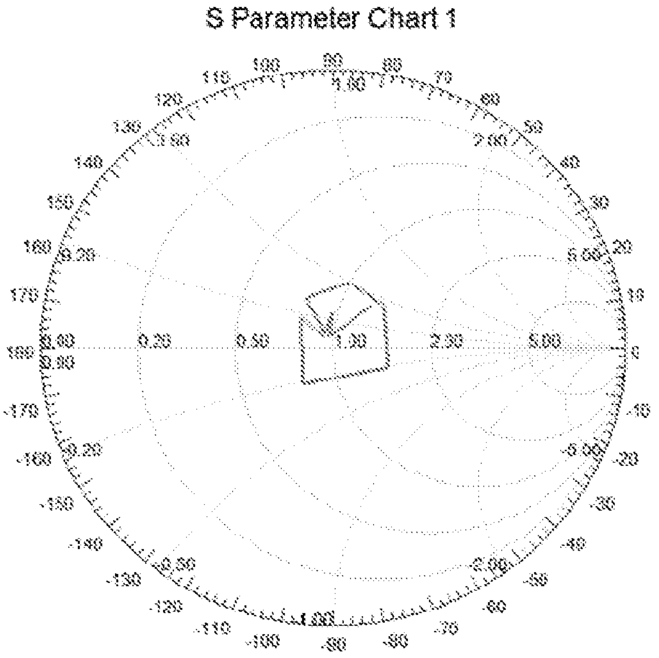
FIG. 12 is a Smith chart of a holographic antenna at a horizontal direction angle $\theta_0$ of −30° according to an embodiment of the present disclosure.
Figure 13:
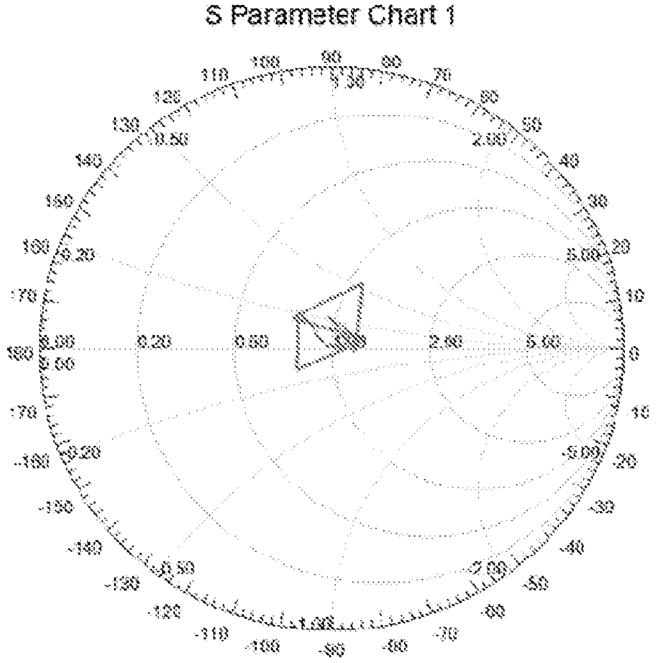
FIG. 13 is a Smith chart of a holographic antenna at a horizontal direction angle $\theta_0$ of 30° according to an embodiment of the present disclosure.

Further, a simulation is performed with HFSS (High Frequency Structure Simulator) to obtain the following three angles: −30°, 0° and 30° and 64 slit openings in total, the first 10 disposition areas in the distribution at the angles of −30°, 0° and 30° are respectively as follows: 11001001100 . . . , 0111001110 . . . , 0000111110 . . . . FIG. 8 is a simulated radiation pattern of a holographic antenna at a horizontal direction angle $\theta_0$ of 0° according to an embodiment of the present disclosure. FIG. 9 is a simulated radiation pattern of a holographic antenna at a horizontal direction angle $\theta_0$ of −30° according to an embodiment of the present disclosure. FIG. 10 is a simulated radiation pattern of a holographic antenna at a horizontal direction angle $\theta_0$ of 30° according to an embodiment of the present disclosure. FIG. 11 is a Smith chart of a holographic antenna at a horizontal direction angle $\theta_0$ of 0° according to an embodiment of the present disclosure. FIG. 12 is a Smith chart of a holographic antenna at a horizontal direction angle $\theta_0$ of −30° according to an embodiment of the present disclosure. FIG. 13 is a Smith chart of a holographic antenna at a horizontal direction angle $\theta_0$ of 30° according to an embodiment of the present disclosure. The impedance matching performance of the holographic antenna is excellent in the embodiment of the present disclosure, as shown in FIGS. 8 to 13.

In some examples, a size of each slit opening 111 is smaller than a half wavelength λg/2 of the medium. In an embodiment of the present disclosure, the size of each slit opening 111 is set to λg/3, each slit opening 111 has a length between λg/2 and λg/6; and a width between λg/10 and λg/20. Usually, a deviation in a range from 10% to 20% can be allowed to be presented in the optimized size, and the deviation in the range has a less influence on the accuracy of the beam pointing, so that the process compatibility can be improved.

In some examples, in addition to the above structure, the holographic antenna further includes a feed structure configured to feed a microwave signal into the waveguide structure 20.

Figure 14:
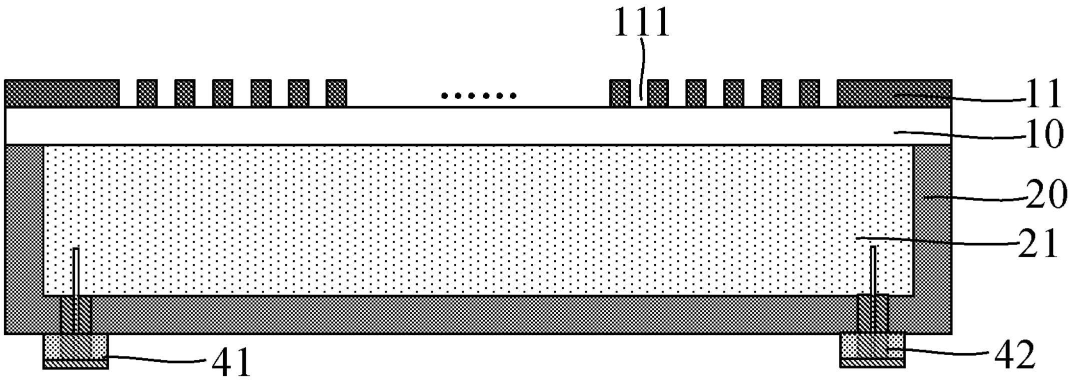
FIG. 14 is a schematic diagram of a holographic antenna according to an embodiment of the present disclosure.

In one example, FIG. 14 is a schematic diagram of a holographic antenna according to an embodiment of the present disclosure. As shown in FIG. 14, the feed structure includes a coaxial probe including, but not limited to, SMA (Sub-Miniature-A). Specifically, the microstrip line is provided with an excitation port 11*a* and a load port 11*b*, and a main portion 11*c* connected between the excitation port 11*a* and the load port 11*b*; the main portion 11*c* is provided with the plurality of slit openings 11 arranged side by side along an extending direction thereof. The coaxial probe in the feed structure may include a first coaxial probe 41 and a second coaxial probe 42. For one antenna unit, the inner core of the first coaxial probe 41 is inserted into the waveguide structure 20, and electrically connected to the excitation port 11*a* of the microstrip line, for feeding a microwave signal into the excitation port 11*a* of the microstrip line. The inner core of the second coaxial probe 42 is also inserted into the waveguide structure 20, and connected to the load port 11*b* of the microstrip line, for impedance matching.

Figure 15:
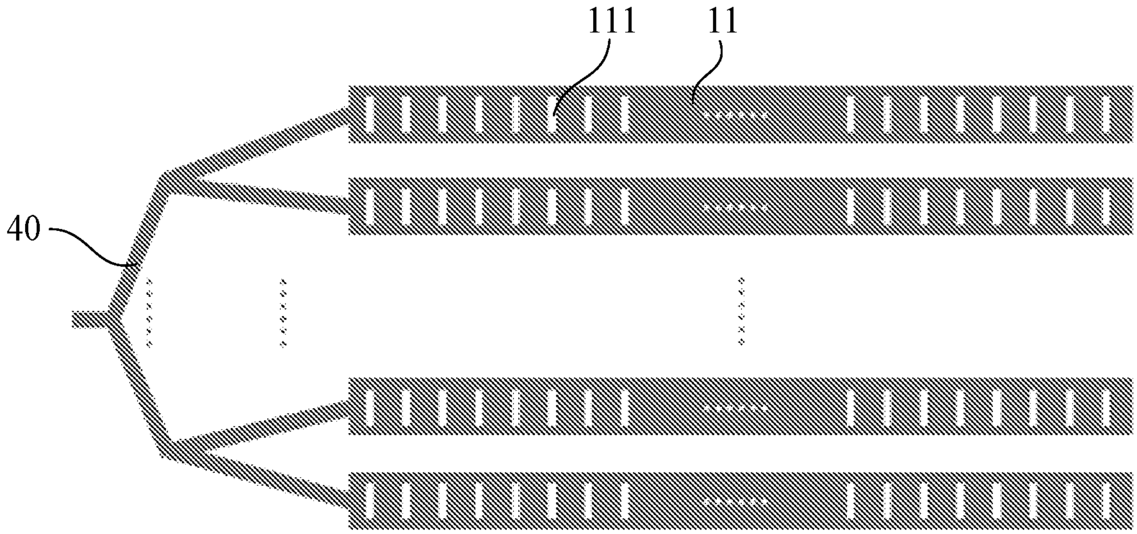
FIG. 15 is a schematic diagram of another holographic antenna according to an embodiment of the present disclosure.

In some examples, FIG. 15 is a schematic diagram of another holographic antenna according to an embodiment of the present disclosure. As shown in FIG. 15, when a plurality of antenna units are included, the feed structure may be a power division feed network configured to feed the plurality of antenna units. For example: the number of the antenna units is $2^n$, and the power division feed network includes a waveguide power division feed network 40, including sub-waveguides 401 in n stages; each sub-waveguide 401 includes a main line and two branches connected to the main line; for each sub-waveguide 401 located at the first stage, two main lines of the sub-waveguide 401 are respectively connected to the waveguide structures 20 of two antenna units, and different branches are connected to the waveguide structures 20 of different antenna units; two branches of each sub-waveguide 401 located at the (i+1)th stage are respectively connected to the main lines of two sub-waveguides 401 located at the i-th stage, and the main branches of different sub-waveguides 401 located at the i-th stage are connected to different branches of the corresponding sub-waveguides 401 located at the (i+1) th stage, which; $1<i\leq N-1$.

Figure 16:
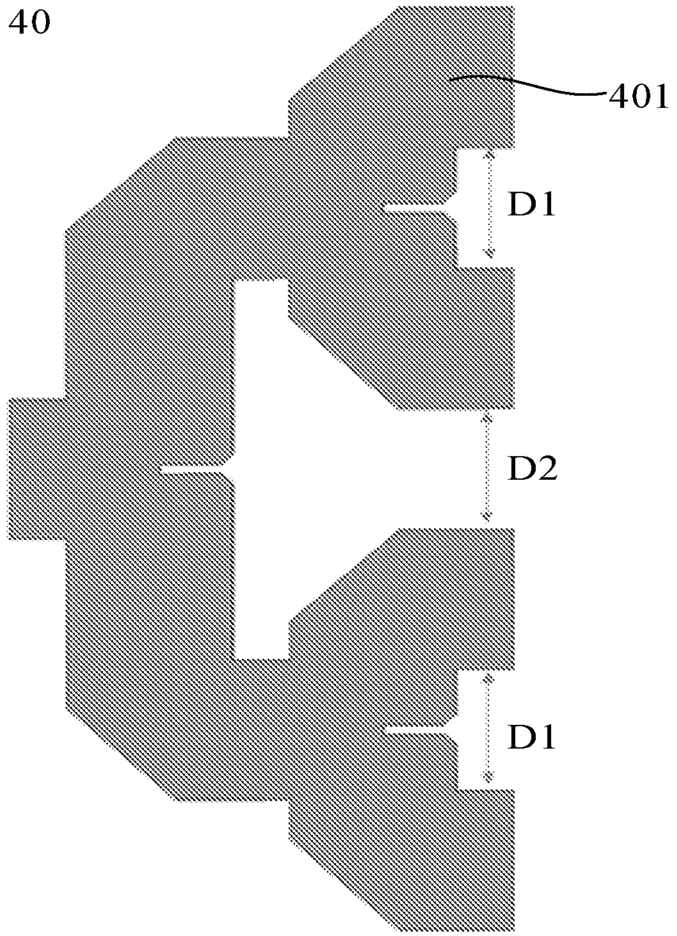
FIG. 16 is a schematic diagram of a structure of a waveguide power division feed network of a holographic antenna according to an embodiment of the present disclosure.

Particularly, in FIG. 16, the holographic antenna includes four antenna units as an example. The waveguide power division feed network 40 has a one-to-two and two-to-four structure including sub-waveguides 401 in two stages. For each sub-waveguide 401 located at the first stage, two main lines of each sub-waveguide 401 are respectively connected to the waveguide structures 20 of two antenna units, and different branches are connected to the waveguide structures 20 of different antenna units; the two branches of each sub-waveguide 401 at the second stage are connected to the main lines of the two sub-waveguides 401 at the first stage.

Figure 17:
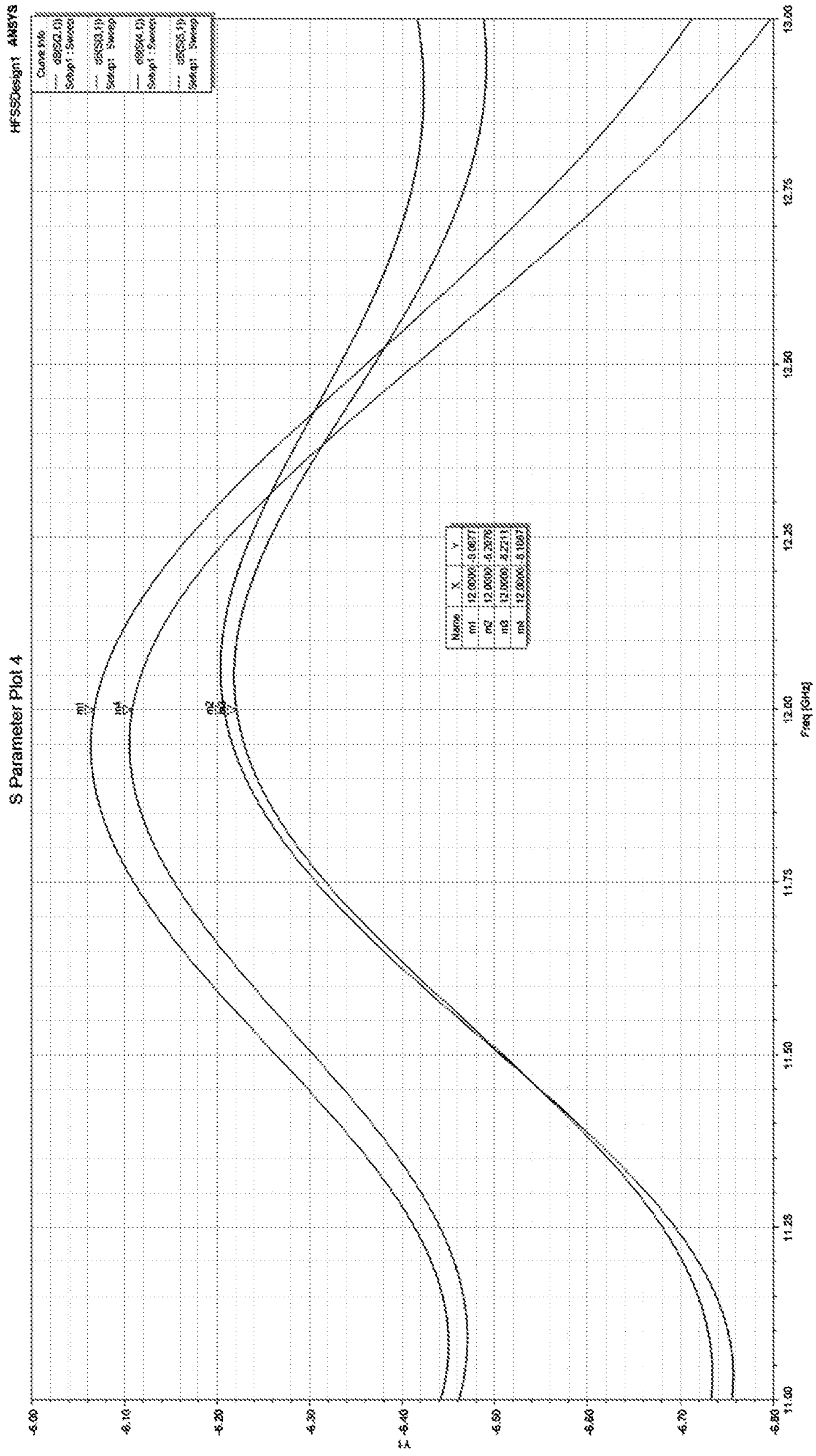
FIG. 17 is a simulated diagram of a power distribution of four ports of the waveguide power division feed network of FIG. 16.

Further, the maximum distance between branches of each sub-waveguide 401 is D1, and the minimum distance between any two adjacent sub-waveguides 401 in each stage is D2, and D1=D2. As shown in FIG. 16, widths and angles of the respective portions of each sub-waveguide 401 are provided such that the power distribution of the respective ports is achieved, wherein the design error is 0.12 dB. The power distribution of the respective ports is substantially achieved, as shown in FIG. 17, and the transmission loss of the microwave signal can be effectively reduced.

It should be noted that when the plurality of antenna units are included and the feed structure adopts the waveguide power division feed network 40, the opening of the waveguide cavity of each of the sub-waveguides 401 located at the first stage may be directly connected to the sidewall of the waveguide structure 20 of the corresponding antenna unit at a position where the sidewall of the waveguide structure 20 has openings therein, thereby implementing feeding of the microwave signal.

In some examples, switching units may be further disposed in each antenna unit, and on a side of the radiation layer 11 away from the first dielectric substrate 10. The switching units may be disposed in a one-to-one correspondence with the slit openings 111. Each switching unit is configured to control the corresponding slit opening 111 to feed out the radio frequency signals. A switching state of the slit opening 111 may be controlled by a switching state of the corresponding switching unit according to a beam direction.

Figure 18:
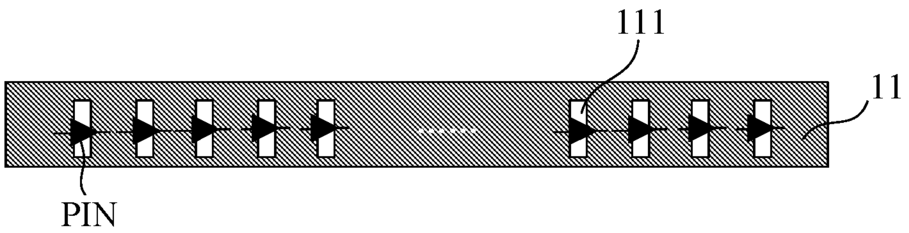
FIG. 18 is a schematic diagram of a structure of a first switching unit in a holographic antenna according to an embodiment of the present disclosure.

FIG. 18 is a schematic diagram of a structure of a first switching unit in a holographic antenna according to an embodiment of the present disclosure. As shown in FIG. 18, each switching unit may be a PIN diode (a positive intrinsic negative diode) or a variable reactance diode Varactor. In this case, the PIN diode or the variable reactance diode Varactor may be integrated with the corresponding slit opening 111, thereby realizing a capability of regulating and controlling a diadic amplitude or a continuous amplitude. For example: by taking an example in which each switching unit is the PIN diode, an input of a bias voltage to the PIN diode is controlled, so that a forward bias/reverse bias of the PIN diode is controlled. When the slit opening 111 is required to be in an on state, the bias voltage input to the corresponding PIN diode is greater than a conduction threshold of the PIN diode (or a threshold voltage for causing the PIN diode to enter the on state), and the PIN diode is conducted (or the PIN diode enters the on state; or the PIN diode is turned on); when the slit opening 111 is required to be in an off state, the bias voltage input to the corresponding PIN diode is smaller than the conduction threshold of the PIN diode, and the PIN diode is turned off.

Figure 19:
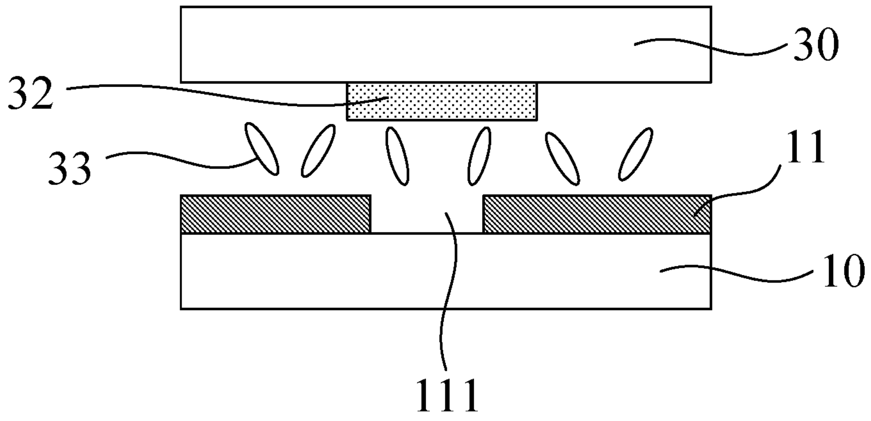
FIG. 19 is a schematic diagram of a structure of a second switching unit in a holographic antenna according to an embodiment of the present disclosure.

FIG. 19 is a schematic diagram of a structure of a second switching unit in a holographic antenna according to an embodiment of the present disclosure. As shown in FIG. 19, each switching unit is a liquid crystal switch, that is, each switching unit is provided with an opposite substrate 30 opposite to the first dielectric substrate 10, a control electrode 31 on the opposite substrate 30, and a liquid crystal layer 32 between a layer where the control electrode 31 on the opposite substrate 30 is located and a layer where the microstrip line is located. By changing a voltage applied to the control electrode 31, a rotation angle of liquid crystal molecules of the liquid crystal layer 32 is changed, thereby realizing a continuous regulation and control for an amplitude of the radio frequency signal radiated from each slit opening 111.

Figure 20:
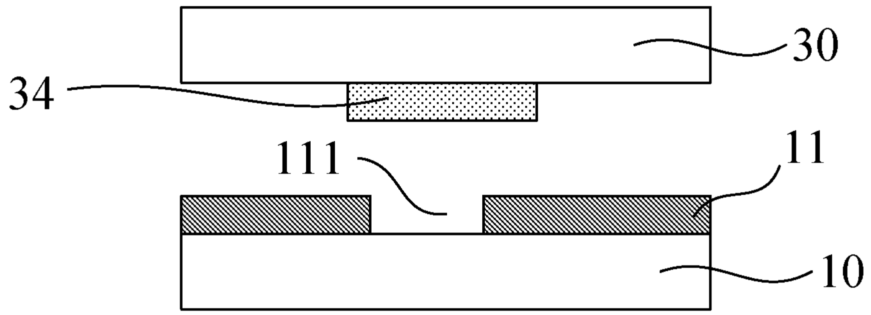
FIG. 20 is a schematic diagram of a structure of a third switching unit in a holographic antenna according to the embodiment of the present disclosure.

FIG. 20 is a schematic diagram of a structure of a third switching unit in a holographic antenna according to the embodiment of the present disclosure. As shown in FIG. 20, each switching unit is a micro electro mechanical system (MEMS) switch. For example: each switching unit is provided with an opposite substrate 30 opposite to the first dielectric substrate 10, and a plurality of patch electrodes 34 on the opposite substrate 30 and in a one-to-one correspondence with the plurality of slit openings 111, wherein the opposite substrate 30 is a flexible substrate. By applying a voltage to each patch electrode 34, a distance between the patch electrode 34 and the corresponding slit opening 111 is adjusted under the action of an electric field force, thereby realizing a continuous regulation and control for an amplitude of the radiated radio frequency signal.

In some examples, a material of the first dielectric substrate 10 includes, but is not limited to, PCB, PET, and polymer low-loss dielectric materials.

In some examples, a material of the radiation layer 11 is a metal material including, but not limited to, copper. In the holographic antenna provided by the embodiment of the present disclosure, the waveguide filled with the slow wave medium is optimally designed, and the single-mode transmission is ensured to be realized in a required frequency band, so that the high-order mode excitation in the waveguide slit antenna design is reduced as much as possible. According to the holographic principle, in the beam regulation and control process, different directions of the beam are realized by designing slit patterns at different positions on the surface of the waveguide array, and the impedance matching in a large angle range is realized by combining a single-mode transmission waveguide, so that the beam forming characteristic is improved. In the embodiment of the present disclosure, the radiation layer is formed on the upper surface of the waveguide array by plating a metal etching pattern on the first dielectric substrate, the waveguide feed structure is provided below the radiation layer; the dynamic modulation of the beam is realized by liquid crystals; and patterns are analysed according to an algorithm, and the switching units at different slit openings are powered on and deflected to control the radiation of energy through the slit openings, and finally realize the dynamic beam control.

The holographic antenna has a wide application scene, and has the advantages of beam reconfiguration, multi-beam generation, multi-frequency beam generation, high-gain beam focusing and the like, so that the holographic antenna has important application in aspects of satellite communication, mobile communication, imaging, wireless charging, multi-user MIMO (multiple input multiple output) and the like.

In a second aspect, embodiments of the present disclosure further provide a method for manufacturing a holographic antenna, where the method may be used to manufacture the holographic antenna of any one of the above embodiments. The method may include the following steps:

S1, providing a first dielectric substrate.

S2, forming a radiation layer including slit openings on the first dielectric substrate through a patterning process.

S3, filling a filling medium in the waveguide cavity of the waveguide structure.

It should be noted that the waveguide structure may be formed in advance, and the waveguide structure may be formed by CNN.

S4, assembling the first dielectric substrate and the waveguide structure together, wherein an orthographic projection of the slit openings on the first dielectric substrate is located in an orthographic projection of the waveguide cavity on the first dielectric substrate.

The step S3 may be performed before the steps S1 and S2.

When the holographic antenna further includes switching units, by taking the switching units as liquid crystal switches as an example, the manufacturing method of the embodiment of the present disclosure may further include the following steps.

S5, providing an opposite substrate.

S6, forming patch electrodes on the opposite substrate, wherein each patch electrode is provided at a position of the corresponding slit opening.

S7, filling a liquid crystal layer between the first dielectric substrate and the opposite substrate.

It should be noted that the patch electrodes are located on a side of the opposite substrate close to the liquid crystal layer, and the radiation layer is located on a side of the first dielectric substrate close to the liquid crystal layer.

The manufacturing method for the holographic antenna in the embodiment of the present disclosure is completed.

In a third aspect, the embodiment of the present disclosure provides an electronic device that may include the above holographic antenna. The holographic antenna further includes a transceiver unit, a radio frequency transceiver, a signal amplifier, a power amplifier, and a filtering unit. The antenna may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the antenna in the communication system and is processed by the filtering unit, the power amplifier, the signal amplifier, and the radio frequency transceiver (not shown in the drawings), the transparent antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the transparent antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the transparent antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the communication system, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the transparent antenna, and the antenna radiates the signals. In the process of receiving signals by the communication system, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the antenna provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A holographic antenna, comprising: at least one antenna unit, each of which comprises a waveguide structure, a first dielectric substrate and a radiation layer; wherein the waveguide structure comprises a bottom wall and a sidewall connected together to define a waveguide cavity of the waveguide structure, and a filling medium is filled in the waveguide cavity;

the first dielectric substrate is on a side of the filling medium away from the bottom wall of the waveguide structure; and the radiation layer is on the first dielectric substrate, and is provided with a plurality of slit openings therein; an orthographic projection of the plurality of slit openings on the first dielectric substrate is within an orthographic projection of the waveguide cavity on the first dielectric substrate;

wherein the radiation layer comprises a microstrip line; the plurality of slit openings are arranged side by side along an extending direction of the microstrip line, and a length direction of each slit opening is perpendicular to the extending direction of the microstrip line.

2. The holographic antenna of claim 1, wherein the first dielectric substrate is on the sidewall of the waveguide structure and forms an enclosed space together with the waveguide cavity of the waveguide structure.

3. The holographic antenna of claim 1, wherein the first dielectric substrate and the radiation layer are within the waveguide cavity of the waveguide structure.

4. The holographic antenna of claim 1, wherein the radiation layer is on a side of the first dielectric substrate away from the filling medium; the antenna unit further comprises a plurality of switching units arranged on a side of the radiation layer away from the first dielectric substrate; the plurality of switching units correspond to the plurality of slit openings, respectively; and each of the plurality of switching units is configured to control a switching state of a corresponding slit opening of the plurality of slit openings.

5. The holographic antenna of claim 4, wherein each of the plurality of switching units comprises any one of a PIN diode, a variable reactance diode, a liquid crystal switch, and a MEMS switch.

6. The holographic antenna of claim 1, further comprising a feed structure configured to feed a microwave signal into the waveguide structure.

7. The holographic antenna of claim 6, wherein the feed structure comprises a coaxial probe.

8. The holographic antenna of claim 6, wherein the at least one antenna unit comprises a plurality of antenna units; and the feed structure comprises a power division feed network.

9. The holographic antenna of claim 8, wherein the at least one antenna unit comprises $2^n$ antenna units, and the power division feed network comprises a waveguide power division feed network, comprising sub-waveguides in n stages; each sub-waveguide comprises one main line and two branches connected to the main line;

for each sub-waveguide at the first stage, two branches of the sub-waveguide are respectively connected to the waveguide structures of two antenna units, and different branches are connected to the waveguide structures of different antenna units; and two branches of each sub-waveguide at the (i+1)th stage are respectively connected to the main lines of two sub-waveguides at the i-th stage, and the main branches of different sub-waveguides at the i-th stage are connected to different branches of the corresponding sub-waveguides at the (i+1)th stage, which; $1<i\leq N-1$.

10. The holographic antenna of claim 9, wherein a maximum distance between the two branches of each sub-waveguide is D1, and a minimum distance between any two adjacent sub-waveguides in each stage is D2, and D1=D2.

11. The holographic antenna of claim 1, wherein a width of each slit opening is in a range of $\lambda g/10$ to $\lambda g/20$; and a length of each slit opening is in a range of $\lambda g/2$ to $\lambda g/6$.

12. The holographic antenna of claim 1, wherein the filling medium comprises a slow wave medium.

13. A method for manufacturing a holographic antenna, comprising: forming at least one antenna unit; wherein the forming at least one antenna unit comprises:

forming a waveguide structure;

forming a filling medium in a waveguide cavity of the waveguide structure; and providing a first dielectric substrate formed with a first radiation layer on a side of the filling medium away from a bottom wall of the waveguide structure; wherein the radiation layer is provided with a plurality of slit openings therein; an orthographic projection of the plurality of slit openings on the first dielectric substrate is located in an orthographic projection of the waveguide cavity on the first dielectric substrate;

wherein the radiation layer comprises a microstrip line; the plurality of slit openings are arranged side by side along an extending direction of the microstrip line, and a length direction of each slit opening is perpendicular to the extending direction of the microstrip line.

14. An electronic device, comprising the holographic antenna of claim 1.

15. The electronic device of claim 14, wherein the first dielectric substrate is on the sidewall of the waveguide structure and forms an enclosed space together with the waveguide cavity of the waveguide structure.

16. The electronic device of claim 14, wherein the first dielectric substrate and the radiation layer are within the waveguide cavity of the waveguide structure.

17. The electronic device of claim 14, wherein the radiation layer is on a side of the first dielectric substrate away from the filling medium; the antenna unit further comprises a plurality of switching units arranged on a side of the radiation layer away from the first dielectric substrate; the plurality of switching units correspond to the plurality of slit openings, respectively; and each of the plurality of switching units is configured to control a switching state of a corresponding slit opening of the plurality of slit openings.

18. The electronic device of claim 17, wherein each of the plurality of switching units comprises any one of a PIN diode, a variable reactance diode, a liquid crystal switch, and a MEMS switch.

* * * * *